United States Patent

Newell et al.

[15] 3,653,729
[45] Apr. 4, 1972

[54] ELECTRICALLY CONTROLLED HYDRAULIC VALVE OF SELF-LAPPING TYPE

[72] Inventors: George K. Newell, Punta Gords, Fla.; Glenn T. McClure, McKeesport, Pa.

[73] Assignee: Westinghouse Air Brake Company, Wilmerding, Pa.

[22] Filed: Dec. 19, 1969

[21] Appl. No.: 886,475

[52] U.S. Cl. ................................303/50, 137/84, 137/85, 137/86, 303/15, 303/20, 303/40, 303/54
[51] Int. Cl. .........................................................B60t 15/02
[58] Field of Search .........................................303/13–15, 20, 303/40, 50, 55, 54, 59, 68; 137/84, 85, 86

[56] References Cited

UNITED STATES PATENTS

| 2,638,921 | 5/1953 | Caldwell et al. | 137/84 X |
|---|---|---|---|
| 2,719,534 | 10/1955 | Williams | 137/84 |
| 2,800,913 | 7/1957 | Swartwout et al. | 137/84 |
| 2,804,877 | 9/1957 | Rosenberger | 137/84 |
| 3,097,019 | 7/1963 | Riedl | 303/40 X |

Primary Examiner—Milton Buchler
Assistant Examiner—John J. McLaughlin
Attorney—Ralph W. McIntire, Jr.

[57] ABSTRACT

An electrically controlled hydraulic valve device of the self-lapping type including a self-lapping supply valve for supplying hydraulic operating pressure to vehicle brake apparatus at a degree controlled by a pilot valve, which, in turn, is mechanically operated by a solenoid for causing the supply valve to supply at maximum operating pressure when the solenoid is completely deenergized, and to effect zero operating pressure and complete release thereof when the solenoid is fully energized, the degree of said operating pressure between said zero and maximum pressures being infinitely variable inversely to the degree of energization of the solenoid.

5 Claims, 1 Drawing Figure

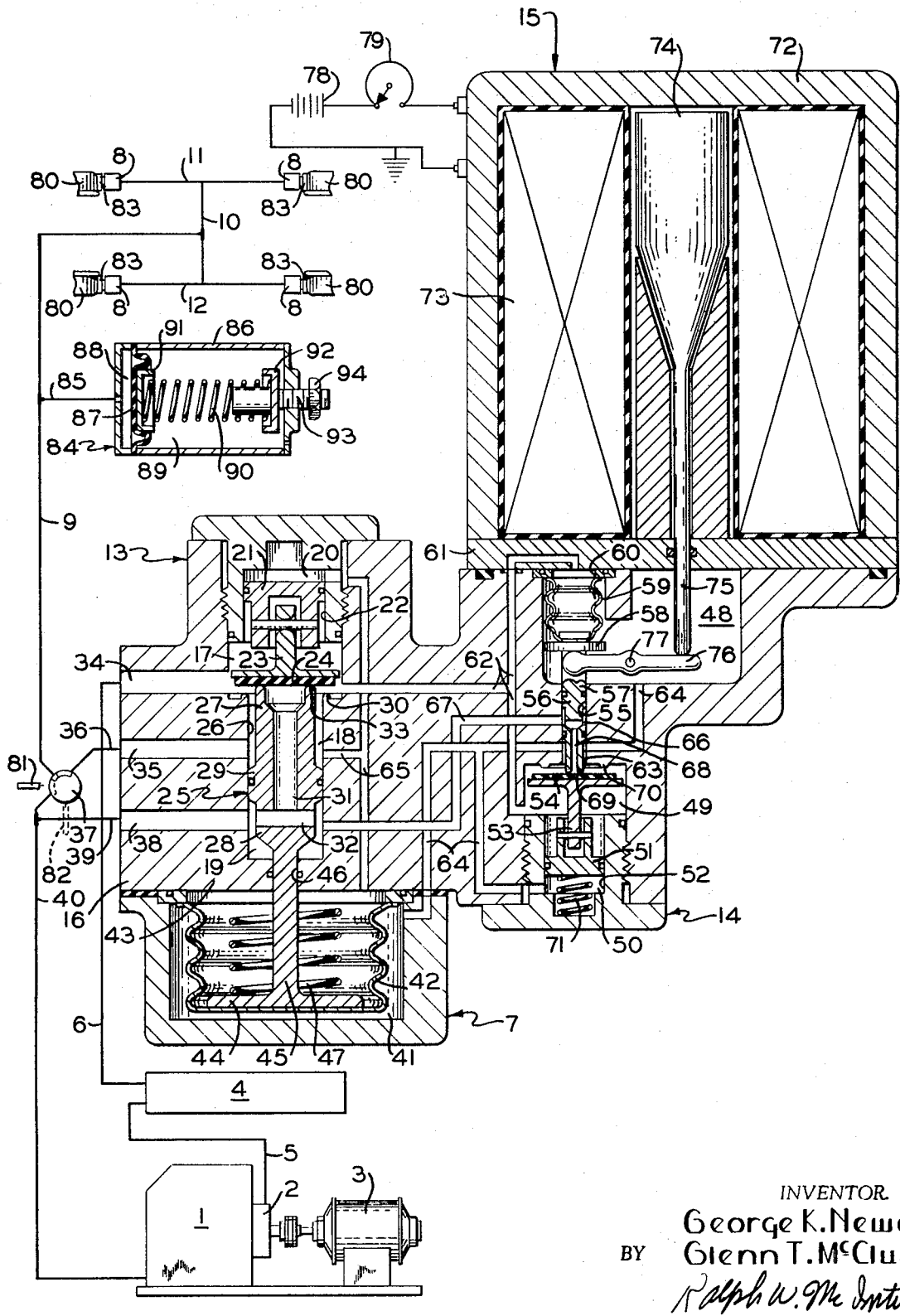

ELECTRICALLY CONTROLLED HYDRAULIC VALVE OF SELF-LAPPING TYPE

BACKGROUND OF INVENTION

As is well known, each car making up a train of captive or rapid transit railway equipment, is a self-sufficient unit capable of operating as a single car independently of the train. Each car, therefore, must be provided with complete sets of systems, such as operator's controls, lighting system, braking system, and power system, to name a few. Because of this costly duplication of equipment on each car, it is important that costs for such equipment be held to a minimum without sacrificing efficiency of operation.

Since air compressors are costly as compared with hydraulic pumps, for example, a hydraulic braking system on each car with remote control, as opposed to a compressed air system, would help reduce equipment cost.

SUMMARY OF INVENTION

The object of the present invention is to provide an efficient, low-cost braking apparatus, including means for remote control thereof, for rapid transit railway vehicles.

The invention comprises an electrically controlled hydraulic valve device for use with conventional hydraulic braking equipment on each car including a motor-driven hydraulic pump for pumping fluid from sump into an accumulator whence it is supplied, under the control of said hydraulic valve device, to the brake cylinders. The hydraulic valve device includes a self-lapping supply valve for supplying hydraulic operating fluid at a pressure determined by a pilot valve, which in turn, is mechanically operated by a solenoid for effecting delivery of operating fluid at pressure inversely related to the degree of energization of the solenoid. Thus, maximum degree of operating pressure is effected with complete deenergization of the solenoid, and zero degree with complete release of operating pressure is effected with full energization of the solenoid, the degree of such operating pressure being infinitely variable between said maximum and zero degrees.

The single FIGURE drawing is a schematic view, with several components in section, of a hydraulic brake system incorporating the invention.

DESCRIPTION AND OPERATION

As shown in the drawing, the hydraulic brake system for each car comprises a hydraulic fluid sump 1 whence fluid is pumped by a pump 2 driven by a motor 3 to an accumulator 4 via a pipe 5. Hydraulic fluid from the accumulator 4, via a pipe 6, is supplied, under the control of a control valve device 7, to brake cylinders 8 via a pipe 9 and branch pipes 10, 11, and 12.

The control valve device 7 comprises a main supply valve portion 13, a pilot valve portion 14, and a solenoid device 15.

The main supply valve portion 13 comprises a casing 16 having formed therein, in a top-to-bottom order as viewed in the drawing, a main supply chamber 17, a main delivery chamber 18, and a main exhaust chamber 19, all in axial alignment relative to each other. Casing 16 also has formed therein, at the end adjacent the main supply chamber 17, a supply valve balancing chamber 20 axially aligned with and separated from said main supply chamber by a coaxially disposed supply valve balancing piston 21 reciprocably movable in a bore 22 formed in said casing.

A piston stem 23, having one end removably connected to the supply valve balancing piston 21 in the main supply chamber 17, carries at its other end a disc-type main supply valve member 24 interposed between said main supply chamber and delivery chamber 18. An exhaust valve member 25 is reciprocably disposed in a bore 26 formed in casing 16. The exhaust valve member 25 has reduced diameter portions 27 and 28 at opposite ends thereof so as to provide radial space, between said reduced diameter portions and bore 26, forming a delivery chamber 18 and an exhaust chamber 19, respectively, said delivery and exhaust chambers being separated by a larger diameter portion or land 29 formed on said exhaust valve member between said reduced diameter portions, said land making sealingly sliding contact with the surface of said bore.

The main supply valve member 24 cuts off communication between supply chamber 17 and delivery chamber 18 when in a seated or cut-off position on an annular supply valve seat 30 encircling the end of bore 26 adjacent supply chamber 17, and opens such communication when in an unseated or supply position relative thereto, as will be explained hereinafter. The exhaust valve member 25 has a passageway 31 extending coaxially from the upper end adjacent the supply valve member 24 to a transversely disposed passageway 32 formed in the lower reduced portion 28. The exhaust valve member 25 has a valve seat 33 encircling the upper end of passageway 31, said valve seat being effecting in an unseated or release position relative to the supply valve member 24 for opening communication between delivery chamber 18 and exhaust chamber 19 via passageways 31 and 32, and in a seated application position on said supply valve member for cutting off said communication. Supply chamber 17 is connected to pipe 6 via a supply passageway 34 in casing 16, and delivery chamber 18 is connected to pipe 9 via a delivery passageway 35 in casing 16 and a pipe 36. A two-position, hand-operated release valve device 37 is interposed between pipes 36 and 9 for a purpose to be hereinafter disclosed. Exhaust chamber 19 is connected via an exhaust passageway 38 in casing 16 and a pipe 39 to a sump return pipe 40, said sump return pipe being connectable to pipe 9 via the release valve device 37 for a purpose to be hereinafter disclosed.

Casing 16 has a main diaphragm chamber 41 formed in the lower end, as viewed in the drawing, opposite balancing chamber 20. A bellows-type main diaphragm 42 is operably disposed in diaphragm chamber 41 with the periphery of the upper open end of said diaphragm sealingly fixed to an internal wall 43 separating said diaphragm chamber from exhaust chamber 19. The lower closed end of main diaphragm 42 is fixed to a follower flange 44 formed on the end of a valve stem 45 extending coaxially downwardly from the lower reduced diameter portion 28 of exhaust valve member 25 into main diaphragm chamber 41 through a bore 46 formed in separating wall 43, said valve stem being sealingly slidable in said bore. A spring 47 compressed between separating wall 43 and flange 44 acts through valve stem 45 for urging exhaust valve member 25 downwardly toward its unseated position relative to valve member 24.

The pilot valve portion 14 of control valve device 7 comprises, in top-to-bottom order as viewed in the drawing, a pilot diaphragm chamber 48, a pilot supply chamber 49, and a pilot balancing chamber 50, all formed in axial alignment in casing 16. Pilot supply chamber 49 is separated from pilot balancing chamber 5 by a pilot valve balancing piston 51 reciprocably operable in a bore 52 formed in casing 16 between said chambers.

A piston stem 53, having one end removably connected to the pilot valve balancing piston 51 in the pilot supply chamber 49, carries at its other end a disc-type pilot supply valve member 54 for controlling communication between said pilot supply chamber and a bore 55 formed in casing 16 and in which a spool-type pilot release valve member 56 is reciprocably disposed. An extension portion 57 of pilot release valve member 56 extends axially into pilot diaphragm chamber 48 and has at the end thereof a flange 58 to which the lower closed end of a bellows-type pilot diaphragm 59 is affixed, the upper open end of said diaphragm being sealingly fixed in surrounding relation to an opening 60 in an inner wall 61 of casing 16.

A multi-branch passageway 62 interconnects the main supply chamber 17 with the pilot supply chamber 49 and the opening 60 to the inner cavity of pilot diaphragm 59.

The pilot release valve member 56 has a reduced diameter portion at the lower end thereof adjacent the pilot supply valve member 54, said reduced diameter portion thus cooperating with bore 57 to form an annular space or pilot delivery chamber 63 constantly interconnected via a multi-branch passageway 64 to main diaphragm chamber 41, pilot diaphragm chamber 48, and pilot balancing chamber 50.

A multi-branch passageway 65 interconnects main delivery chamber 18 with main balancing chamber 20 and the inner cavity of main diaphragm 42.

The pilot release valve member 56 also has an annular groove axially spaced thereon between the pilot delivery chamber 63 and the end carrying the flange 58, said groove cooperating with bore 55 to form a cavity 66 which is constantly connected via an exhaust passageway 67 to main exhaust chamber 19. An axially disposed passageway 68 formed in pilot release valve member 56 has one end opening to cavity 66 and the other end opening to the end of said valve member adjacent pilot supply valve member 54, said other end of said passageway being encircled by a valve seat 69. With valve seat 69 in a seated position on pilot supply valve member 54, communication between pilot supply chamber 49 and main exhaust chamber 19, via passageways 68 and 67, is cut off, and with said valve seat occupying an unseated position relative to said pilot supply valve member, said communication is effected.

A valve seat 70 is formed on casing 16 in pilot supply chamber 49 in surrounding relation to the end of bore 55 opening to said supply chamber. With pilot supply valve member 49 in an unseated or open position relative to valve seat 70, said pilot supply chamber is communicated, via pilot delivery chamber 63 and passageway 64, to main diaphragm chamber 41 and pilot balancing chamber 50, and with said pilot supply valve member in a seated or closed position on valve seat 70, such communication is cut off. A spring 71, compressedly disposed in pilot balancing chamber 50 and acting through pilot balancing piston 51 and piston stem 53, urges the pilot supply valve member 54 toward its seated position on valve seat 70.

The solenoid device is of the conventional type comprising a casing 72 for housing a coil 73 and a magnetically responsive plunger 74. The plunger 74 is provided with an integrally formed rod 75 extending concentrically downwardly therefrom, through an opening formed in the inner wall 61, into pilot diaphragm chamber 48, said rod being reciprocably movable with sealingly sliding contact through said opening.

The end of rod 75 in pilot diaphragm chamber 48 makes abutting engagement with the upper side of one end of a layer member 76 pivotally supported by a pin 77 in the casing 16, the upper side of the other end of said lever member making abutting engagement with the underside of flange 58 on the end of extension 57 of the pilot release valve member 56.

A power source 78, in this instance represented symbolically as a battery, provides electrical energy for energizing the coil 73 of the solenoid device 15 through the control of a rheostat 79. The power and control circuits, including the power source 78 and rheostat 79, of all cars making up a train are connected in parallel relation through a train circuit (not shown), so that the entire train may be controlled from any one of the cars. Energization of coil 73 causes downward movement of plunger 74 and rod 75 which, in turn, urges clockwise pivotal rotation of lever 76 about pin 77 with a force at a degree determined by the manual setting of rheostat 79. Clockwise pivotal rotation of lever 76 causes upward movement of the pilot release valve member 56 toward a release position in which valve seat 69 is unseated from pilot supply valve member 54.

In operation, it will first be assumed that the coil 73 of the solenoid device 15 is completely deenergized. Hydraulic fluid at a predetermined certain pressure is supplied from the accumulator 4, via pipe 6 and passageway 34, to main supply chamber 17 whence said fluid under pressure flows via passageway 62 to the inner cavity of pilot diaphragm 59. Fluid pressure inside diaphragm 59 urges the pilot release valve member 56 downwardly to cause seating of valve seat 69 on pilot supply valve member 54, thereby closing communication from pilot supply chamber 49 to passageways 68 and 67, and moving said pilot supply valve to its unseated or open position relative to valve seat 70. At the same time, fluid pressure supplied from passageway 62 to pilot supply chamber 49 flows past unseated pilot supply valve 54 to the pilot balancing chamber 50 and to pilot diaphragm chamber 48, via pilot delivery chamber 63 and multi-branch passageway 64, for balancing the pressure on opposite sides of pilot balancing piston 51 and on opposite sides of pilot diaphragm 59, respectively, thus maintaining the status quo between release valve member 56 and pilot supply valve member 54.

Also, at the same time, fluid pressure flowing past unseated pilot supply valve member 54 into passageway 64 reaches main diaphragm chamber 41 to act on the underside of main diaphragm 42. Fluid pressure acting on the underside of diaphragm 42 causes said diaphragm to move upwardly for maintaining valve seat 33 of the exhaust valve member 25 in seated position on main supply valve member 24 and for moving said main supply valve member to its unseated or supply position relative to valve seat 30. With valve member 24 in its supply position, fluid pressure in supply chamber 17 flows through delivery chamber 18, passageway 35, pipe 36, valve device 37, pipe 9, and pipes 10, 11, and 12 to the several brake cylinders 8 for effecting a brake application on respective wheels 80.

Fluid pressure from delivery chamber 18 also flows via passageway 65 to main balancing chamber 20 for balancing pressure on the opposite side of piston 21, and to the inner cavity of main diaphragm 42. When fluid pressure inside main diaphragm 42 equals that on the outside thereof, or when the two pressures attain a balanced state relative to each other, spring 47 is effective for moving said main diaphragm to a neutral position in which exhaust valve member 25 is moved downwardly until main supply valve member 24 assumes its cut-off or seated position on valve seat 30.

The brakes on the wheels 80, thus, remain fully applied, in accordance with the degree of fluid pressure supplied from the accumulator 4, as long as the solenoid device 15 remains deenergized or until such time that the balance of pressures prevailing in the main supply valve portion 13, particularly on main diaphragm 42, and in the pilot valve portion 14 is disturbed or caused to assume an unbalanced state. Since the supply valve portion 13, as above noted, is a self-lapping type valve mechanism, it is operative in maintaining the degree of fluid pressure delivered to the brake cylinders 8 at the level established when supply valve member 24 was caused to seat on valve seat 30. If for any reason, however, the degree of fluid pressure in the brake cylinders 8 and, therefore, on the underside of supply valve member 24, in balancing chamber 20, and inside the main diaphragm 42 (all of which are interconnected through passageway 65) should drop to a level below that initially established, fluid pressure on the underside of said main diaphragm becomes effective for moving said main diaphragm and the exhaust valve member 25 upwardly to move said main supply valve member from its seated position on valve seat 30. Fluid pressure from main supply chamber 17 may then flow past the unseated main supply valve 24 to restore fluid pressure in the brake cylinders 8, as above described, to the initially established level and restore the balance state of pressures on the piston 21 and main diaphragm 42 for rendering spring 47 effective in causing reseating of said main supply valve.

If it should be necessary or desirable to reduce the degree of brake application on the wheels 80, reduction of fluid pressure in the brake cylinder 8 is effected by operating the rheostat 79 to a selected setting at which the solenoid coil 73 is energized to a degree compatible with the degree of desired brake reduction. Energization of coil 73 and resulting downward movement of plunger 74 cause rod 75 to exert a force on lever 76 commensurate with the degree of said energization, thereby effecting clockwise rotation of said lever which, in turn, causes upward movement of the pilot release valve member 56 against the pressure-balanced pilot diaphragm 59. Whereupon valve seat 69 is unseated from pilot supply valve 54, the latter remaining seated on valve seat 70.

With pilot release valve 56 unseated from pilot supply valve member 54, fluid pressure from pilot diaphragm chamber 48 and from pilot balancing chamber 50 is reduced via multi-branch passageway 64, past the unseated release valve member, through passageways 68 and 67, main exhaust chamber 19, passageway 38, and pipes 39 and 40 to the sump 1. At the same time, fluid pressure in main diaphragm chamber 41 is also reduced to the sump 1 via the course immediately above described, which reduction of fluid pressure in said main diaphragm chamber renders the pressure inside main diaphragm 42 effective for moving the exhaust valve member 25 downwardly to its release position in which valve seat 33 is unseated from the main supply valve member 24. Thus, a reduction of fluid pressure in the brake cylinder 8 occurs by such fluid pressure flowing to the sump 1 via pipes 11, 12, 10, and 9, through valve device 37, pipe 36, passageway 35, delivery chamber 18, past the unseated exhaust valve member 25, through passageways 31 and 32, exhaust chamber 19, passageway 38, and pipes 39 and 40.

According to the degree of energization of the solenoid coil 73 and, therefore, the force exerted on lever 76 by rod 75, fluid pressure in pilot diaphragm chamber 48 and balancing chamber 50 is reduced until the pressure inside the pilot diaphragm 59 and the pressure in pilot supply chamber 49 acting on the upper side of balancing piston 51 become effective for overcoming the combined opposing force of that exerted by said lever on flange 58 and of the reduced pressure in said diaphragm and balancing chambers. The pilot release valve member 56 is moved downwardly until valve seat 69 is again seated on pilot supply valve member 54 to cut off further pressure reduction in diaphragm chamber 48 and balancing chamber 50. With pilot release valve member 56 reseated on valve member 54, the various forces acting on several elements comprising the pilot release valve portion 14 resume a balanced state. Reseating of pilot release valve member 56 on pilot supply valve member 54 also terminates further reduction of fluid pressure in main diaphragm chamber 41.

Similar the the pilot release valve portion 14, therefore, with further reduction of fluid pressure in main diaphragm chamber 41 terminated, a balanced state of forces acting on the several elements of the main supply valve portion 13 is resumed when fluid pressure in the brake cylinders 8 (and, therefore, inside main diaphragm 42 and in balancing chamber 20 which are all interconnected via passageway 65) has reduced to a level at which fluid pressure in chamber 41, acting through main diaphragm 42, becomes effective for moving exhaust valve member 25 upwardly and restoring it to its seated or application position on main supply valve member 24.

The solenoid device 15 is intended to be of such capacity that, when fully energized, that is, with the rheostat 79 operated to its maximum current supply position, the force exerted by rod 75 on lever 76 is sufficient for effecting a complete reduction of fluid pressure in the brake cylinders 8, in the manner above described, and therefore a total release of the brake application.

In the event of malfunctioning of the solenoid device 15 or in the absence of electrical power, the hand-operated release valve device 37 may be used in effecting a release of the brake application. Normally the operating handle of the release valve device 37 is set in an application position, illustrated in the drawing by a solid outline 81, in which application position communication between pipes 36 and 9 is established, and registry of pipe 9 with pipe 40 returning to the sump 1 is cut off. When the operating handle of the release valve device 37 is manually set in a release position, illustrated in the drawing by a broken outline 82, communication between pipes 36 and 9 is cut off, and pipe 9 is communicated with pipe 40, so that fluid pressure prevailing in the brake cylinders 8 is released to the sump 1 via pipes 12, 11, 10, 9, and 40, and a release of an existing brake application is thus effected.

With the brake apparatus herein disclosed in service on a railway vehicle truck, it is subjected to certain operating conditions that may affect the operating efficiency of the apparatus, particularly when a brake application is in effect for retarding the vehicle when in motion. In such a situation, if the vehicle is moving over a rough section of railway track, such track condition may cause a somewhat vibratory action between the wheels 80 and respective brake shoes 83. With a brake application in effect and the shoes 83, therefore, in contact with the wheels 80, the vibratory action, above mentioned, produces a corresponding erratic variation in the brake-applying forces between the brake shoes and the wheels. The variations in brake-applying forces are, in turn, reflected in the hydraulic fluid in the piping between the brake cylinders 8 and the control valve device 7, and, as such, are transmitted therethrough to said control valve device, which, because of its self-lapping characteristics above described and, therefore, in response to such vibratory fluid pressure variations, is caused to operate erratically in an effort to maintain said fluid pressure at the level selected by the operator in effecting the brake application.

For the purpose of dampening or neutralizing the effects of the vibratory fluid pressure variations above discussed, a cushion or vibration dampening device 84 is interposed in the piping via which hydraulic fluid pressure is transmitted from the control valve device 7 to the brake cylinder devices 8. More specifically, the cushion device 84 is connected by a pipe 85 to pipe 9 leading from the delivery passageway 35 through release valve device 37.

The cushion device 84 comprises a casing 86 in which a diaphragm-type piston 87 divides said casing into a pressure chamber 88 and an atmospheric or spring chamber 89. Pressure chamber 88 is connected to pipe 85, and, therefore, the side of diaphragm 87 adjacent said pressure chamber is subject to the prevailing fluid pressure in said pipe (and, therefore, in the brake cylinders 8 as communicated by way of pipes 9, 10, 11, and 12). The opposite side of diaphragm 87 is subject to the force exerted thereon by a spring 90 of preselected compression rating, and compressedly disposed in spring chamber 89 between a piston follower 91 carried by said diaphragm and a spring seat 92 having abutting contact with the end of an adjusting screw 93 axially aligned with said spring and adjustably secured in the casing 86. A lock nut 94 is provided for locking the screw 93 in any adjusted position.

The cushion device 84 operates in conventional manner in absorbing momentary vibratory impulses that may occur in the fluid pressure system between the control valve device 7 and the brake cylinders 8, thereby neutralizing any effects of said vibratory impulses on said control valve device that would otherwise cause or tend to cause unnecessary operation thereof. The maximum degree of such vibratory impulses absorbed or neutralized by the cushion device 84 is determined by maximum deflection produced on spring 90 by such impulses, said maximum deflection, of course being determined by the compression adjustment of said spring. Any variation or change of fluid pressure in the delivery system in excess of the maximum degree, therefore, would be sufficient to cause the control valve device 7 to operate responsively thereto.

Having now described the invention, which we claim as new and desire to secure by Letters Patent is:

1. A control valve device for controlling the degree of fluid pressure supplied from a source to fluid pressure operable apparatus, said control valve device comprising the combination of:
   a. a casing having formed therein:
      i. a supply passageway charged with fluid pressure from the source,
      ii. a delivery passageway via which fluid pressure may be delivered to the fluid pressure operable apparatus, and
      iii. an exhaust passageway;
   b. supply valve means disposed in said casing and comprising:
      i. a supply valve member having a supply position in which a supply communication between said supply and delivery passageways is open and being operable to a cut-off position in which said supply communication is closed, ii. an exhaust valve member operable to an application position in which an exhaust communication between said delivery and exhaust passageways is closed, and to an exhaust position in which said exhaust communication is open, and iii. a reciprocably operable main diaphragm member having one side subject to fluid pressure in said delivery passageway and the opposite side subjectable to a control pressure, said main diaphragm member being movable in one direction in response to prevailing control pressure acting on said opposite side for operating said exhaust valve member to its said application position and said supply valve member to its said supply position, and being movable in an opposite direction in response to prevailing fluid pressure acting on said one side for operating said supply valve member to its said cut-off position and said exhaust valve member to its said exhaust position;

c. pilot means disposed in said casing for effecting supply and release of variable control pressure to and from, respectively, said opposite side of said main diaphragm member, said pilot means comprising:

i. a pilot supply valve member having an open position in which fluid pressure in the supply passageway is communicated to said opposite side of said main diaphragm member, and being operable to a closed position in which communication between said supply passageway and said opposite side of said main diaphragm is cut off, ii. a release valve member having a first position, in which a release communication between said opposite side of said main diaphragm member and said exhaust passageway is cut off, and being operable to a second position in which said release communication is open, iii. a reciprocably operable pilot diaphragm member having one side constantly subject to fluid pressure prevailing in said supply passageway and the opposite side communicated and subject thereto when said release valve member is in its said first position, said pilot diaphragm member being effective, when the forces of the fluid pressures acting on the both sides thereof are in a balanced state, for maintaining said pilot supply valve member in its said closed position and said release valve member in its said first position; and d. actuating means disposed in said casing and selectively energizable between minimum and maximum limits, said actuating means being effective, when energized, for exerting an additional force on said opposite side of said pilot diaphragm member and causing movement thereof in one direction for operating said release valve member to its said second position to effect reduction of fluid pressure acting on said opposite side of said main diaphragm member and on said opposite side of said pilot diaphragm member, the degree of said additional force being commensurate with the degree of energization of said actuating means, e. said pilot diaphragm member being operative in response to such reduction of fluid pressure acting on its said opposite side and consequent restoration of said forces acting on opposite sides of said pilot diaphragm member to a balanced state for returning said release valve member to its said first position.

2. A control valve device, as set forth in claim 1, wherein said actuating means comprises:

a. a solenoid device including a plunger member axially movable upon energization of the solenoid device; and b. a lever member interconnecting said plunger member with said pilot diaphragm member for transmitting said additional force from said plunger member to said pilot diaphragm member in accordance with the degree of energization of the solenoid device.

3. Fluid pressure operable vehicle brake apparatus comprising, in combination:

a. a source of fluid under pressure;

b. brake cylinder means operable responsively to fluid pressure for effecting a brake application on the vehicle and to release of such fluid pressure for releasing the brake application; and c. conduit means via which fluid pressure from said source may be delivered to and released from said brake cylinder means;

wherein the improvement comprises:

d. a control valve device interposed in said conduit means for controlling delivery and release of fluid pressure to and from, respectively, said brake cylinder means, said control valve device comprising:

i. a casing having a supply passageway connected via said conduit means to said source, a delivery passageway connected via said conduit means to said brake cylinder means, and an exhaust passageway;

ii. supply valve means operable to a supply position in which a supply communication between said supply passageway and said delivery passageway is open and an exhaust communication between said delivery passageway and said exhaust passageway is closed, to a cut-off position in which said supply communication is closed and said exhaust communication is open, and to a lap position in which both communications are closed;

iii. a main diaphragm member subjectable on one side to fluid pressure prevailing in said supply passageway and subject on the opposite side to fluid pressure prevailing in said delivery passageway, said main diaphragm member being operable in one direction in response to prevailing pressure acting on said one side for moving said supply valve means to its said supply position and in an opposite direction in response to prevailing pressure acting on said opposite side for moving said supply valve means to its said cut-off position, said main diaphragm assuming a neutral position, in response to a balanced state of pressures acting on both sides thereof, for operating said supply valve means to its said lap position;

iv. pilot valve means operable to an open position in which a charging communication between said supply passageway and said one side of said main diaphragm is open and a release communication between said one side and said exhaust passageway is closed, to a release position in which said charging communication is closed and said release communication is open, and to a lap position in which both said charging and said release communications are closed;

v. a pilot diaphragm subjectable on one side to fluid pressure acting on said one side of said main diaphragm and subject on the opposite side to fluid pressure in said supply passageway, said pilot diaphragm being operable in one direction in response to prevailing pressure acting on said opposite side for moving said pilot valve means to its said open position and in an opposite direction in response to prevailing pressure acting on said one side for moving said pilot valve means to its said release position, said pilot diaphragm assuming a neutral disposition in response to a balanced state of fluid pressure forces acting on both sides thereof for operating said pilot valve means to its said lap position; and vi. means for exerting a variable force on said pilot diaphragm cooperatively with fluid pressure acting on said one side thereof and causing movement of said pilot diaphragm in said opposite direction for moving said pilot valve means to its said release position in which fluid pressure acting on said one side of said main diaphragm is reduced via said release communication to a degree corresponding to the degree of said variable force exerted on the pilot diaphragm.

4. Fluid pressure operable vehicle brake apparatus, as set forth in claim 3, wherein said last-mentioned means comprises:

a. a variably energizable solenoid device;
b. a plunger movable out of a normal position in response to energization of said solenoid device;
c. a pivotally disposed lever member making abutting contact at one end with said one side of said pilot diaphragm and at the other end with said plunger, said lever being subjectable at its said other end to a force exerted thereon by movement of said plunger out of its said normal position and pivotable in response thereto for transmitting said force to said one side of said pilot diaphragm, the degree of said force being commensurate with the degree of such energization of said solenoid device.

5. Fluid pressure operable vehicle brake apparatus, as set forth in claim 3, further characterized by means connected in said conduit means in parallel relation to said delivery passageway and said brake cylinder means for absorbing fluid pressure pulsations in said conduit means.

* * * * *